United States Patent [19]
Walther

[11] 4,241,278
[45] Dec. 23, 1980

[54] INDICATOR DEVICE WITH VACUUM FLUORESCENCE ELEMENTS

[75] Inventor: Henry Walther, Wiesbaden-Nordenstadt, Fed. Rep. of Germany

[73] Assignee: VDO Adolf Schindling AG, Frankfurt am Main, Fed. Rep. of Germany

[21] Appl. No.: 6,618

[22] Filed: Jan. 26, 1979

[30] Foreign Application Priority Data

Feb. 6, 1978 [DE] Fed. Rep. of Germany ....... 2804924

[51] Int. Cl.³ ............................................ H05B 41/38
[52] U.S. Cl. .................................... 315/106; 315/101; 315/107; 315/224; 315/311; 315/169.1; 328/270
[58] Field of Search ............... 315/84.6, 101, 105–107, 315/169.1, 224, 307, 311; 328/270; 313/496, 497; 323/18, 22 T

[56] References Cited
U.S. PATENT DOCUMENTS

| 3,567,995 | 3/1971 | Lauritzen et al. | 315/311 |
| 4,156,166 | 5/1979 | Shapiro et al. | 315/224 X |
| 4,158,794 | 6/1979 | Sandler | 315/169.1 |
| 4,167,690 | 9/1979 | Gange | 315/105 X |

Primary Examiner—Eugene R. LaRoche
Attorney, Agent, or Firm—Martin A. Farber

[57] ABSTRACT

A indicator device with vacuum fluorescence elements controlled or triggered by a driving circuit, the heaters of the elements lying in a heating circuit. The heating circuit contains a switch which is controlled or triggered by a clock generator and the clock pulse frequency and the pulse duty factor of the control signal pulses are selected such that the effective value of the pulsed heating current is equal or approximately equal to the dc heating current in accordance with the elements.

10 Claims, 1 Drawing Figure

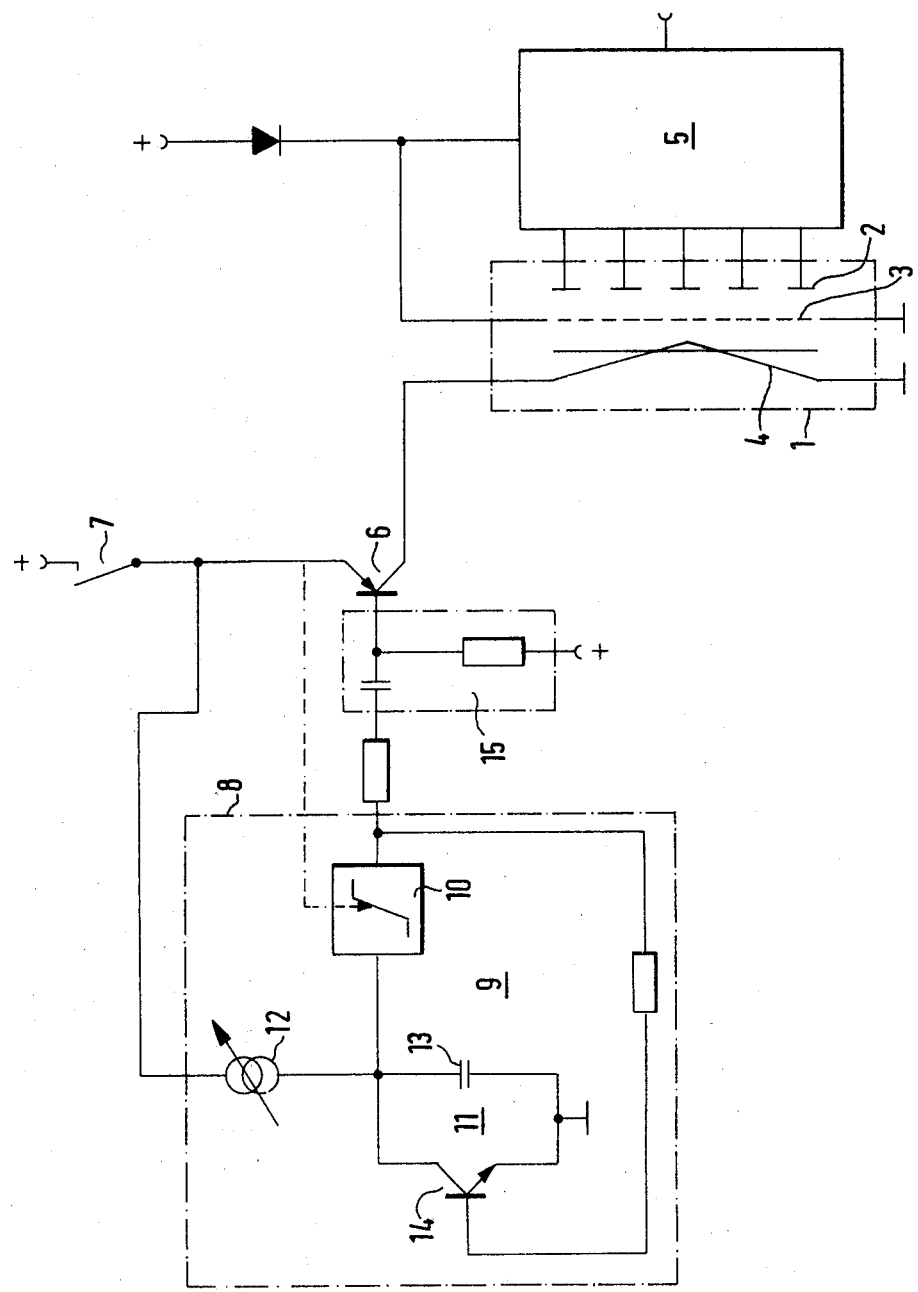

INDICATOR DEVICE WITH VACUUM FLUORESCENCE ELEMENTS

The invention relates to an indicator device with vacuum fluorescence elements controlled or triggered by a driving circuit, the heaters of the elements lying in a heating circuit.

With the known indicator devices of this type when merely an operating dc voltage is available for heating, as this for example is the case with clocks or watches which can be carried around or with indicator instruments in motor vehicles, for production of the necessary heating voltage, a pre-resistor is present in the heating circuit, over which circuit the comparatively high heating current also flows. The consequence is that a comparatively high leakage power or dissipation arises in the heating circuit, which causes disadvantages to the battery service life with a carriable clock or watch, and respectively, undesirably strongly loads the supply system with vacuum fluorescence indicator instruments in motor vehicles. Moreover with larger indicator instruments, additional means and measures are provided for removal of the heat which is produced by the preresistor or preresistors, respectively, which disadvantageously affects the production costs.

It is an object of the present invention to avoid these disadvantages.

It is consequently a task and object of the invention to create an indicator device in the heating circuit of which there occurs the smallest possible power dissipation with operation with direct dc voltage.

It is another object of the present invention to aid the solution of the above-mentioned object in the manner that the heating circuit contains a switch (6) which is controlled or triggered by a clock (generator) (8) and the clock or timing-pulse rate and the pulse width-reception ratio or pulse duty factor of the control signal pulses are selected such that the effective value of the pulsed heating current is equal or approximately equal to the direct heating current in accordance with the elements.

By these measures in accordance with the invention there arises a clocked or pulsed heating current which leads to a considerably smaller dissipation in the heating circuit. Without particular optimization the dissipation drops by more than 60% by means of the measures in accordance with the invention. This leads to such a strong reduction of the heat generation that particular means and measures for the removal of heat can be entirely eliminated. A particular advantage of the indicator device in accordance with the invention is that with such a clocked heating current a substantially more uniform brightness of the indicator may be achieved than is the case with the known indicator devices. A further particular advantage of the indicator device in accordance with the invention is that the warming or heating up period for the vacuum fluorescence elements is substantially lower than that of the known indicator devices in which known devices the heating electrode is applied with a dc current.

With the present invention the control or triggering of the switch can take place with a control signal of a constant pulse width-repetition ratio (or pulse duty factor) and a clock pulse rate (or frequency) which is dependent on the operating voltage amplitude, or by means of a clock generator which produces a control signal of a constant clock pulse rate and a pulse width-repetition ratio (or pulse duty factor) which is dependent on the operating voltage amplitude. The last mentioned embodiment has the advantage that it may be realized with a substantially lower cost than the first-mentioned embodiment form. By the change of the clock pulse rate and of the pulse duty factor, respectively, in dependency on the amplitude of the operating voltage it is achieved that the heating current remains constant independent of variations or fluctuations in the operating voltage, while the pulse duty factor and the clock pulse rate, respectively, is held to such a value that between two control pulses the temperature of the heating electrode does not drop under a non-permissibly small value.

According to an advantageous embodiment of the invention the clock generator (8) (which produces a control signal of a constant clock pulse rate and a pulse duty factor, the latter which is dependent on the operating voltage amplitude) is a voltage-controlled monoflop or monostable multivibrator (9). Such a type of monoflop may be realized with a comparatively low cost.

In an advantageous manner a Schmitt trigger can be provided as the voltage controlled monoflop (9), the input of the Schmitt trigger being wired with a transistorized charging-, and respectively, discharging-circuit (11), the latter circuit being controlled from or by the output of the Schmitt trigger (10) and its minimum operating current changing in dependency on the operating voltage amplitude.

Another advantageous possibility exists in providing a Schmitt trigger, the input of which is wired with a transistorized charging-, and respectively, discharging-circuit (11), the latter being fed by a current source (12) which is controlled in dependency on the operating voltage amplitude and being controlled from the output of the Schmitt trigger (10).

Upon a faulty or erroneous triggering of the Schmitt trigger, in order to prevent the switch which lies in the heating circuit from being controlled continuously in the "on" or operating forward flow-through conducting direction, which has the result of an overheating and consequent destruction of the heating electrode, it is most suitable to connect a high-pass filter (15) between the clock generator (8) and the switch (6).

With the above and other objects and advantages in view, the present invention will become more clearly understood in connection with the detailed description of preferred embodiments, when considered with the accompanying drawing, of which the only FIGURE is a simplified circuit diagram of the indicator device in accordance with the invention.

Referring now to the drawing, the indicator device comprises a vacuum fluorescence element 1 which comprises five anodes 2, a grid 3 and a heater cathode 4. The anodes 2 are connected to a control or gate circuit 5, which circuit corresponding to the input signal which is fed to it applies the individual anodes 2 with operating potential such that these anodes emit a certain optical signal (letters, digits or figures, geometrical figures or the like).

The heating cathode 4 together with a transistor 6 and a switch 7 (which switch can be the ignition switch of a motor vehicle with use of the indicator device in the motor vehicle) forms a heating circuit which lies at operating dc voltage, which heating circuit is driven pulsed or clocked by a corresponding control or triggering of the transistor 6.

For the control or triggering of the transistor 6, a clock generator 8 is provided which is constructed as a voltage-controlled monoflop 9. The latter comprises a Schmitt trigger 10, the input of which lies at a charging-, and respectively, discharging- circuit 11. This circuit 11 is controlled and triggered by the output of the Schmitt trigger 10 and is fed by a current source 12. The current which is emitted from the current source 12 in this manner is dependent on the prevailing amplitude of the operating voltage from time to time and indeed such that with the operating voltage amplitude becoming larger the current which is given off by the current source increases. Instead of such a current source there can be used also a Schmitt trigger with a variable minimum operating current which drops with the operating voltage amplitude becoming larger and which increases with the operating voltage amplitude becoming smaller. This embodiment form is indicated in double or duplicate dot-dashed lines in the drawing.

After closing the switch 7 the current source 12 charges the capacitor 13 of the charging-, and respectively, discharging-circuit 11, until at the input of the Schmitt trigger 10, the trigger threshold is reached. By means of the signal change developing now at the output of the Schmitt trigger, the transistor 14 is switched "on" into its forward flow-through conducting direction and the capacitor 13 can now discharge, which has the result of flipping the Schmitt trigger 10 back.

Between the flipping operation and flipping-back operation of the Schmitt trigger 10, by the output of the Schmitt trigger via the high-pass filter 15, the transistor 6 is switched "on" into its forward flow-through conducting direction so that during this time interval, current can flow through the heater circuit.

After the Schmitt trigger 10 flips back, the transistor 14 is controlled in its reverse or non-conducting direction and the capacitor charging operation begins anew. In this manner a succession of pulses develops at the output of the Schmitt trigger 10, the frequency of which pulses is constant. Since upon a change in the operating voltage, the current which is emitted from the current source also changes and this leads to a change of the charging time of the capacitor 13, the pulse width-repetition ratio or pulse duty factor of the pulse series is dependent on the prevailing operating voltage amplitude at the time and indeed the pulse duty factor becomes larger with the operating voltage amplitude becoming smaller and becomes smaller with the operating voltage amplitude becoming larger. In this manner a constant heating or calorific power is guaranteed even during fluctuations or variation in the operating voltage.

The individual construction assemblies—clock generator, high-pass filter, control circuit—and components—transistor 6—can be combined into a single integrated circuit. This brings not only advantages with respect to the construction volume of the indicator device but also permits even a most extremely cost advantageous production of the indicator device in large numbers of pieces.

In the drawing the small rectangular boxes represent resistors.

While there have been disclosed several embodiments of the invention it is to be understood that these embodiments are given by example only and not in a limiting sense.

I claim:

1. In an indicator device with vacuum fluorescence elements controlled by a driving circuit, the heaters of the elements lying in a heating circuit and adapted to be applied with a dc operating voltage, the improvement wherein the heating circuit contains a switch, a clock generator means for triggering said switch so as to provide a pulsed heating current in the heating circuit and for selecting the clock pulse frequency and the pulse duty factor of control signal pulses thereof such that the effective value of the pulsed heating current is at least approximately equal to the dc heating current in compliance with the elements.

2. The indicator device as set forth in claim 1, wherein said clock generator means for providing a control signal of constant pulse duty factor and a clock pulse frequency, the latter being dependent on the amplitude of the operating voltage.

3. The indicator device as set forth in claim 1, wherein said clock generator means for producing a control signal of constant clock pulse frequency and a pulse duty factor, the latter being dependent on the amplitude of the operating voltage.

4. The indicator device as set forth in claim 3, wherein said clock generator means comprises a voltage-controlled monoflop.

5. The indicator device as set forth in claim 4, wherein said voltage-controlled monoflop comprises a Schmitt trigger, the latter having an input and an output, a transistorized charging and discharging circuit, said input of said Schmitt trigger is connected with said charging and discharging circuit, said Schmitt trigger controlling said charging and discharging circuit by the output of said Schmitt trigger and its maximum operating current changes in dependency on the operating voltage amplitude.

6. The indicator device as set forth in claim 4, wherein said voltage-controlled monoflop comprises a Schmitt trigger, a current source constituting means for being controlled in dependency on the operating voltage amplitude, said Schmitt trigger has an input and an output, a transistorized charging and discharging circuit connected to and being fed by said current source, said input of said Schmitt trigger is wired with said charging and discharging circuit, said Schmitt trigger constitutes means for controlling said charging and discharging circuit by the output of said Schmitt trigger.

7. The indicator device as set forth in claim 1, further comprising a high-pass filter connected between said clock generator means and said switch.

8. The indicator device as set forth in claim 1, wherein said switch is a transistor.

9. The indicator device as set forth in claim 1, further comprising means for impressing an operating d.c. voltage across said heating circuit, said switch constitutes means for opening and closing said heating circuit in dependency on the triggering thereof by said clock generator means.

10. The indicator device as set forth in claim 1, wherein a heater cathode of the vacuum fluorescence elements is disposed in said heating circuit.

* * * * *

UNITED STATES PATENT AND TRADEMARK OFFICE
CERTIFICATE OF CORRECTION

PATENT NO. : 4,241,278
DATED : December 23, 1980
INVENTOR(S) : Henry Walther

It is certified that error appears in the above-identified patent and that said Letters Patent are hereby corrected as shown below:

Column 4 Line 34 (Claim 5) "ger controlling" should read

--ger constitutes means for controlling--

Signed and Sealed this

Seventh Day of April 1981

[SEAL]

Attest:

RENE D. TEGTMEYER

Attesting Officer     Acting Commissioner of Patents and Trademarks